(12) United States Patent
Tanaka et al.

(10) Patent No.: US 8,515,613 B2
(45) Date of Patent: Aug. 20, 2013

(54) ENVIRONMENTAL MAP CORRECTION DEVICE AND AUTONOMOUS MOBILE DEVICE

(75) Inventors: Shoji Tanaka, Kyoto (JP); Tsuyoshi Nakano, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 141 days.

(21) Appl. No.: 13/063,962

(22) PCT Filed: Aug. 25, 2009

(86) PCT No.: PCT/JP2009/004079
§ 371 (c)(1),
(2), (4) Date: Mar. 15, 2011

(87) PCT Pub. No.: WO2010/032381
PCT Pub. Date: Mar. 25, 2010

(65) Prior Publication Data
US 2011/0178668 A1    Jul. 21, 2011

(30) Foreign Application Priority Data

Sep. 16, 2008  (JP) .................................. 2008-237196

(51) Int. Cl.
*G05D 1/00*  (2006.01)
*G06F 15/18*  (2006.01)
*G05D 1/02*  (2006.01)

(52) U.S. Cl.
CPC ............ *G05D 1/0274* (2013.01); *G05D 1/0246* (2013.01)
USPC .................. 701/25; 701/23; 701/26; 706/12; 382/103

(58) Field of Classification Search
None
See application file for complete search history.

(56) References Cited

U.S. PATENT DOCUMENTS

| | | | | |
|---|---|---|---|---|
| 5,006,988 A | * | 4/1991 | Borenstein et al. ............. | 701/25 |
| 6,667,592 B2 | * | 12/2003 | Jacobs et al. ............. | 318/568.12 |
| 7,539,563 B2 | * | 5/2009 | Yang et al. ...................... | 701/24 |
| 8,160,746 B2 | * | 4/2012 | Wang et al. ................... | 700/259 |

(Continued)

FOREIGN PATENT DOCUMENTS

| JP | 7-129238 A | 5/1995 |
|---|---|---|
| JP | 2005-326944 A | 11/2005 |

(Continued)

OTHER PUBLICATIONS

Official Communication issued in corresponding International Application PCT/JP2009/004079, issued on Apr. 19, 2011.

(Continued)

*Primary Examiner* — James Trammell
*Assistant Examiner* — Todd Melton
(74) *Attorney, Agent, or Firm* — Keating & Bennett, LLP

(57) ABSTRACT

An environmental map correction device that acquires an environmental map that matches an actual ambient environment includes a conversion unit arranged to convert object existence probability information of respective grids configuring a global map into image information (shading information of a black and white image), a display unit arranged to display a global map image based on the converted image information, an operation input unit arranged to receive a correcting operation from a user, a correction unit arranged to correct the global map image displayed by the display unit according to the correcting operation by the user, and an inversion unit arranged to acquire a corrected global map by inverting the corrected global map image (shading information) into the object existence probability information.

5 Claims, 7 Drawing Sheets

(56) References Cited

U.S. PATENT DOCUMENTS

| | | | |
|---|---|---|---|
| 8,195,331 B2 * | 6/2012 | Myeong et al. | 700/245 |
| 8,271,132 B2 * | 9/2012 | Nielsen et al. | 700/250 |
| 2007/0282484 A1 | 12/2007 | Chung et al. | |

FOREIGN PATENT DOCUMENTS

| | | |
|---|---|---|
| JP | 2006-205348 A | 8/2006 |
| JP | 2006-209644 A | 8/2006 |
| JP | 2007-323402 A | 12/2007 |
| JP | 2007-323652 A | 12/2007 |
| JP | 2008-134904 A | 6/2008 |

OTHER PUBLICATIONS

Official Communication issued in International Patent Application No. PCT/JP2009/004079, mailed on Oct. 13, 2009.

Official Communication issued in corresponding Japanese Patent Application No. 2008-237196, mailed on Sep. 11, 2012.

* cited by examiner

ENVIRONMENTAL MAP CORRECTION DEVICE AND AUTONOMOUS MOBILE DEVICE

BACKGROUND OF THE INVENTION

1. Field of the Invention

The present invention relates to an environmental map correction device, and an autonomous mobile device including the environmental map correction device.

2. Description of the Related Art

An autonomous mobile device which autonomously travels in an ambient environment is known. In order for an autonomous mobile device to autonomously travel in an ambient environment, an environmental map showing an area with objects (hereinafter also referred to as the "obstacles") and an area without objects within the travel space is required. Here, Japanese Published Unexamined Patent Application No. H7-129238 discloses a mobile robot which generates a topographic map (environmental map) using topographic data obtained as a result of measuring distances using a laser range finder (or a camera).

The detection results of a laser range finder and the like sometimes contain noise. Moreover, during the creation of an environmental map, if a human being, a mobile object or the like passes through the detection range of the laser range finder, there is a possibility that an object that does not exist on a regular basis is disposed on the environmental map. Meanwhile, even in cases of generating an environmental map from CAD data, there are cases where an object that is to become an obstacle is disposed after the CAD data is created. Thus, there is a possibility that the generated or acquired environmental map and the actual ambient environment will differ. Here, if the generated or acquired environmental map and the actual ambient environment are different, for example, upon planning a travel route from the environmental map, there is a possibility of determining that it is not possible to pass through a passage, which in reality can be passed through, due to the existence of an obstacle, and consequently selecting a detour route.

SUMMARY OF THE INVENTION

In order to resolve the foregoing problems, preferred embodiments of the present invention provide an environmental map correction device that acquires an environmental map which matches the actual ambient environment, and an autonomous mobile device including such an environmental map correction device.

An environmental map correction device according to a preferred embodiment of the present invention includes a display device arranged to display an environmental map showing an object area in which an object exists, an input device arranged to receive a correcting operation from a user to correct the environmental map displayed by the display device, and a correction device arranged to correct the environmental map displayed by the display device based on the correcting operation received by the input device.

According to the environmental map correction device of a preferred embodiment of the present invention, the user can correct the environmental map on the display device by performing correcting operations via the input device. Thus, the difference between the environmental map and the actual ambient environment can be corrected based on the manual operation of the user. Consequently, it is possible to acquire an environmental map which matches the actual ambient environment.

Preferably, the environmental map correction device of a preferred embodiment of the present invention further includes a conversion device arranged to convert, into image information, object existence probability information included in a plurality of grids configuring the environmental map, and an inversion device arranged to invert the image information into the object existence probability information, wherein the display device displays an environmental map image based on image information converted by the conversion device, the correction device corrects the environmental map image displayed by the display device, and the inversion device inverts the image information of the environmental map image corrected by the correction device into the object existence probability information.

In the foregoing case, the conversion/inversion is performed mutually between the object existence probability information and the image information. Thus, it is possible to acquire an environmental map that was corrected as a result of converting the environmental map into an environmental map image and displaying such environmental map image, and correcting the environmental map image displayed on the display device. Accordingly, the environmental map can be corrected more easily.

In the environmental map correction device according to a preferred embodiment of the present invention, preferably, the image information is shading information of a black and white image.

According to this configuration, an environmental map configured from a plurality of grids with object existence probability information can be visually confirmed as a black and white image (environmental map image) in which the object existence probability information is represented as the shading.

The autonomous mobile device according to a preferred embodiment of the present invention includes an environmental map acquisition device arranged to acquire an environmental map showing an object area in which an object exists, any one of the environmental map correction devices for correcting the environmental map acquired by the environmental map acquisition device, a travel route planning device arranged to plan a travel route from the environmental map corrected by the environmental map correction device, and a moving device arranged to drive the autonomous mobile device to travel along the travel route planned by the travel route planning device.

According to the autonomous mobile device of a preferred embodiment of the present invention, since the autonomous mobile device includes any one of the environmental map correction devices, it is possible to acquire an environmental map which matches the actual ambient environment. Thus, for example, upon planning a travel route from an environmental map, it is possible to prevent drawbacks such as determining that it is not possible to pass through a passage, which in reality can be passed through, due to the existence of an obstacle. Consequently, it is possible to move along an optimal travel route that matches the actual ambient environment which is comprehended by the user. Moreover, since the autonomous mobile device is mounted with the environmental map correction device, the successive processes of generating an environmental map, correcting an environmental map, and route planning based on an environmental map can be performed efficiently.

According to various preferred embodiments of the present invention, since the configuration is such that the displayed environmental map is corrected based on the correcting operations made by a user, it is possible to acquire an environmental map which better matches the actual ambient environment.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
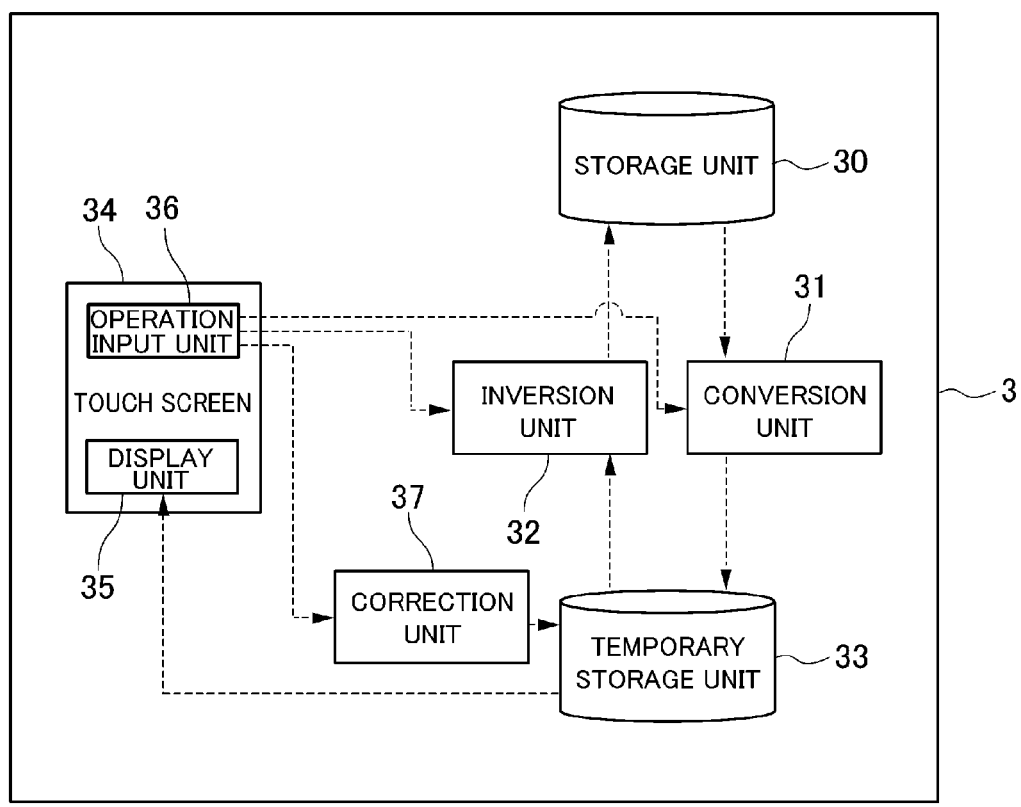
FIG. 1 is a block diagram showing the configuration of the global map correction device according to a preferred embodiment of the present invention.

The preferred embodiments of the present invention are now explained in detail with reference to the appended drawings. Note that, in the respective drawings, the same elements are given the same reference numeral and redundant explanations are omitted.

The configuration of an environmental map correction device (hereinafter referred to as the "global map correction device") 3 according to a preferred embodiment of the present invention is foremost explained with reference to FIG. 1. FIG. 1 is a block diagram showing the configuration of the global map correction device 3.

The global map correction device 3 is preferably used for correcting an environmental map (map showing an area with objects (obstacles) and an area without objects (obstacles); hereinafter referred to as the "global map") based on operations made by a user. The global map correction device 3 preferably includes a microprocessor that performs operations, a ROM that stores programs and the like to cause the microprocessor to execute the respective processes, a RAM that temporarily stores various types of data such as operation results and the like, and a backup RAM that retains stored contents. In order to correct the global map, the global map correction device 3 preferably includes a storage unit 30, a conversion unit 31, an inversion unit 32, a temporary storage unit 33, a touch screen 34, and a correction unit 37. Note that each of the components is preferably configured by combining the foregoing hardware and software. Each of the constituent elements is described in detail below.

The storage unit 30 is configured, for example, from the backup RAM or the like, and, for example, stores the global map acquired by the global map acquisition unit 41 described later. A global map can be generated by using, for example, the well known SLAM (Simultaneous Localization and Mapping). Moreover, the global map may also be generated from an architectural drawing, or a global map generated with another device may be transferred to the global map correction device 3.

Figure 2:
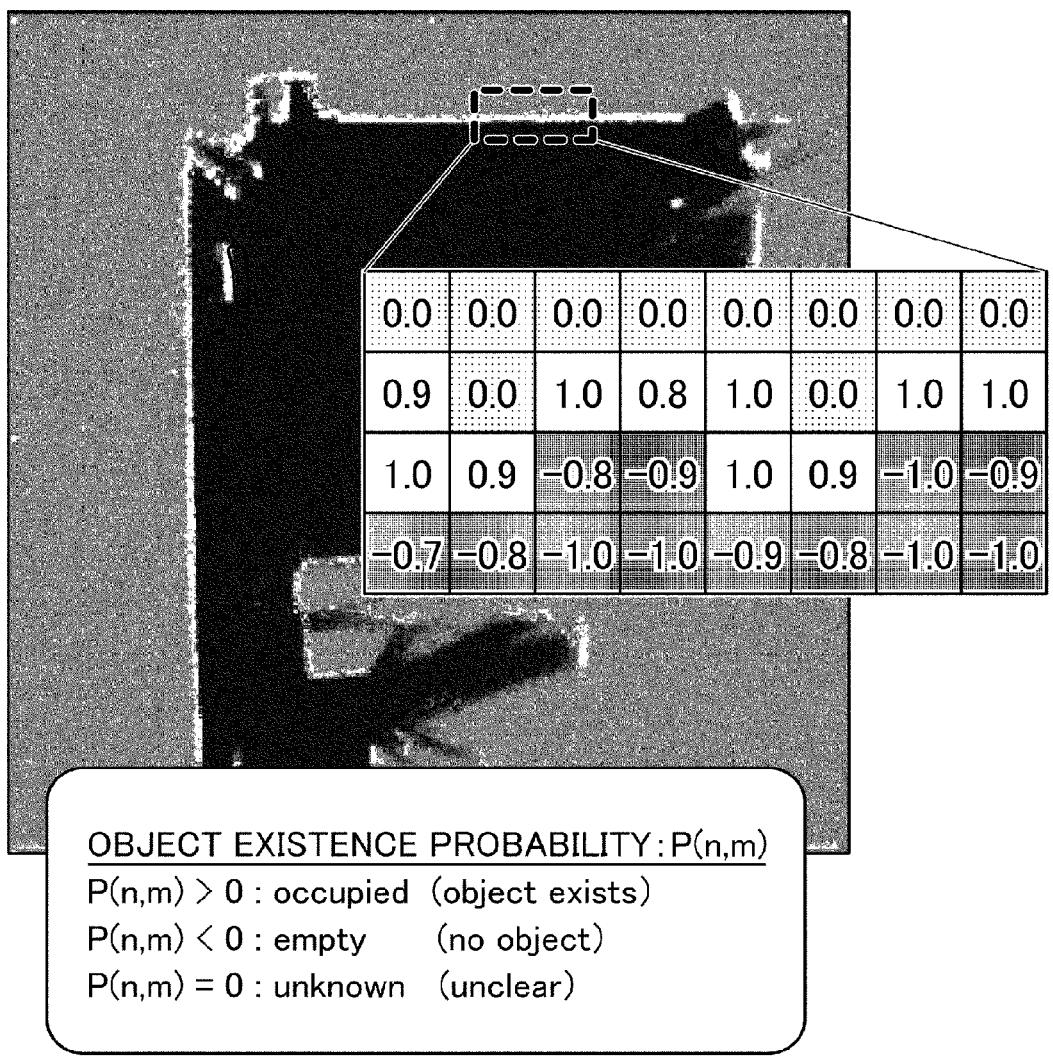
FIG. 2 is a diagram showing an example of the global map (grid map).

Here, an example of the global map stored in the storage unit 30 is shown in FIG. 2. A global map is a grid map of the movable area of the autonomous mobile device, and the location of fixed articles (objects) such as wall surfaces is recorded in the global map. Here, a grid map is a map that is configured from a plane in which a horizontal plane is divided into cells (hereinafter also referred to as the "unit grids" or simply "grids") of a predetermined size (for example, 1 cm×1 cm), and is provided with object existence probability information showing whether an object exists in each unit grid. In this preferred embodiment, a unit grid includes the following area information:

1>object existence probability $P(n, m)$>0: occupied (object exists)

−1<object existence probability $P(n, m)$<0: empty (no object)

object existence probability $P(n, m)$=0: unknown (unclear)

Specifically, a value of "0 to 1" is given to a grid with an object (obstacle) according to its existing probability, and a value of "0 to −1" is given to a grid with no object (obstacle) according to its existing probability. Moreover, "0" is given to a grid in which the existence of an object (obstacle) is unknown. Accordingly, as shown in FIG. 2, a grid with a wall surface (area shown with a white line in FIG. 2) is given a value of "0.8 to 1.0". Moreover, a grid corresponding to a passage portion (area painted in black in FIG. 2) without any object is given a value of "−0.8 to −1.0". In addition, with respect to the back side of the wall surface (area shown in gray in FIG. 2), the corresponding grid is given a value of "0" since the existence of an object is unknown.

Figure 3:
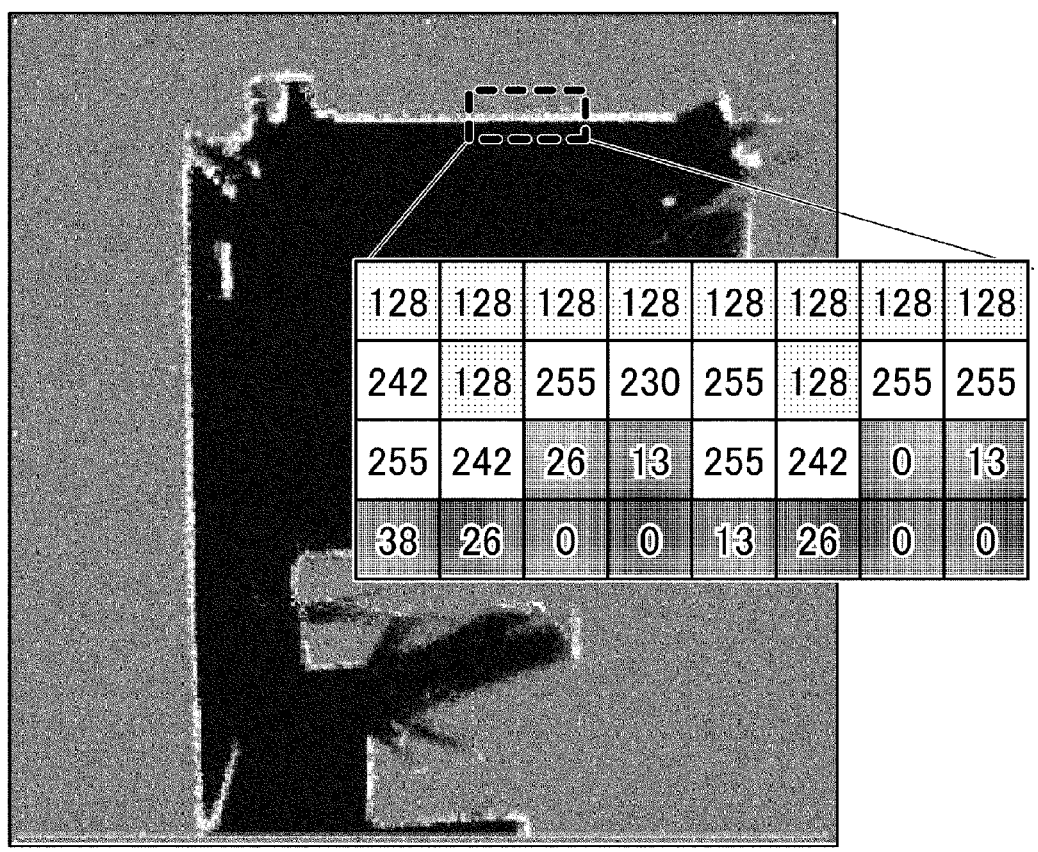
FIG. 3 is a diagram showing an example of the display map.

The conversion unit 31 is used to read the global map stored in the storage unit 30, and generate an display map (global map image) by converting the object existence probability information of the respective grids configuring the global map (grid map) into image information; that is, into shading information of a black and white image. Specifically, the conversion unit 31 functions as the conversion device described in the claims. More specifically, upon converting the object existence probability information into shading information, the conversion unit 31 generates an display map by converting, for each grid, the object existence probability information (−1 to 0 to 1) into shading information (0 to 128 (80H) to 255 (FFH)). Note that, with the shading information of a black and white image, the correspondence is such that complete white is "255" and complete black is "0". Here, an example of the display map generated by the conversion unit 31 is shown in FIG. 3. Note that the display map shown in FIG. 3 was obtained by converting the global map (grid map) shown in FIG. 2. As shown in FIG. 3, the cell where the wall surface is located is converted into an approximately white color (230 to 255). Moreover, the passage portion without any object is converted into an approximately black color (0 to 26). In addition, the back side of the wall surface where the existence of an object is unknown is converted into a gray color (128). The display map generated by the conversion unit 31 is output to a temporary storage unit 33 configured, for example, from the RAM or the like, and is temporarily stored in the temporary storage unit 33 during the correction operation. Note that, here, if the data (object existence probability information) of the foregoing global map is being represented with the 8-bit data (0 to 255 (FFH)) as alike as the shading information of the black and white image, map conversion is not required since the data of the global map can be displayed as is without requiring any conversion.

The touch screen 34 is an input device that is configured by including a display unit 35 made of a liquid crystal display (LCD) or the like, and an operation input unit 36 made of a touch panel or the like to detect the user's touch operation (input). The display unit 35 displays the global map image (corresponding to the environmental map image described in the claims) based on the image information (shading information) of the display map generated by the conversion unit 31. Moreover, the display unit 35 displays a menu bar and various tools and the like to acceptably receive the correcting operation from the user to correct the global map image. Specifically, the display unit 35 functions as the display device described in the claims.

Figure 4:
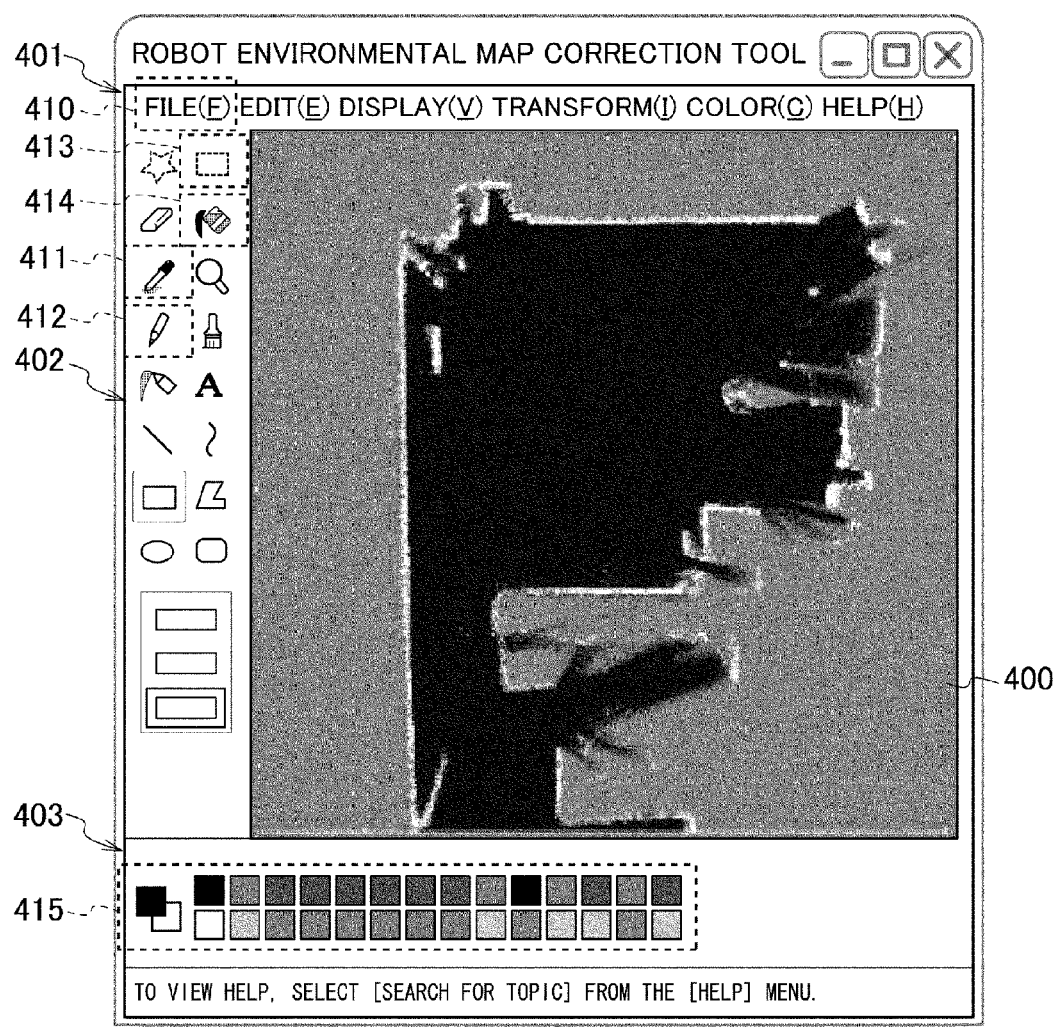
FIG. 4 is a diagram showing an example of the display image of the global map correction device according to a preferred embodiment of the present invention.

Here, an example of the display image displayed on the display unit 35 is shown in FIG. 4.

As shown in FIG. 4, the display image displayed on the display unit 35 is configured, for example, a global map image display area 400, a menu bar display area 401, a tool box display area 402, a palette display area 403, and so on. A global map image that is being corrected is displayed in the global map image display area 400. The menu bar display area 401 displays a menu which classified and summarized the various available functions such as the file dialog 410, for example. The tool box display area 402 displays a plurality of tools usable to select and draw the global map image such as a dropper tool 411, a pencil tool 412, an area designation tool 413, a filling tool 414, and so on. The palette display area 403 displays a palette 415 to designate the drawing color.

The operation input unit 36 is arranged so as to cover the display screen of the display unit 35, and two-dimensional coordinates (X-Y coordinates) are virtually disposed on the surface thereof. The operation input unit 36 is preferably used to acceptably receive the correcting operation from the user, and, when the user performs a touch operation, outputs coordinate information according to the touched position. Note that, for the detection of the touched position, for example, pressure, electrostatic capacity, infrared, ultrasonic and the like are preferably used. Specifically, the operation input unit 36 functions as the input device described in the claims. The operation input unit 36 determines the operations of the user based on the display position of the various icons and the like and the coordinate information showing the position that was touched by the user. Subsequently, the operation input unit 36 outputs the determined operations to the correction unit 37.

The correction unit 37 corrects the global map image displayed on the display unit 35 according to the correcting operation of the user that was acceptably received by the operation input unit 36. Specifically, the correction unit 37 functions as the correction device described in the claims. Here, the operation input unit 36 and the correction unit 37 provided, for example, the following functions to the user. Note that the following functions are merely an example of the functions that are provided by the operation input unit 36 and the correction unit 37:

1. Reading of the global map to be corrected (designation and input of global map)
(1) Open the file dialog 410 and designate the global map to be corrected. Note that a file can be called as the overall global map or as a global map divided into several areas.
2. Designation of the color to be used for overwriting (correction of global map)
(1) Designate a point in the global map with the dropper tool 411 using the color of that point.
(2) Designate a color from the palette 415.
(3) Designate the color by inputting a value from 0 to 255. Note that black is designated within a range of 0 to 127, gray is 128, and white is designated within a range of 129 to 255.
3. Designation of the area to be corrected and correction of that area (correction of global map)
(1) Designate a point in the global map with the pencil tool 412, and write over that point with the designated color.
(2) Designate the area with the area designation tool 413 and fill that area with the designated color using the filling tool 414.
4. Storage of the corrected global map (designation and storage of global map)
(1) Open the file dialog 410 and designate the global map to be stored.

The user can use the foregoing functions to erase an object (obstacle) on the global map image, or add an object on the global map image. Specifically, for example, upon erasing an object (obstacle) on the global map, the object displayed in white is corrected to a black color. Meanwhile, upon adding an object (obstacle) on the global map, the object is drawn in a white color to match the location and shape of that object.

The inversion unit 32 is preferably used to invert the display map (global map image) into a global map by inverting the shading information of the global map image corrected by the correction unit 37 into the object existence probability information of the grid map (global map). Specifically, the inversion unit 32 functions as the inversion device described in the claims. More specifically, the inversion unit 32 acquires the global map (grid map) by converting the shading information (0 to 128 (80H) to 255 (FFH)) into the object existence probability information (−1 to 0 to 1) for each grid. Specifically, the inversion unit 32 has the opposite function as the conversion unit 31. Here, the grid map (global map) shown in FIG. 2 is generated when the display map shown in FIG. 3 is inverted. Note that the global map generated with the inversion unit 32 is output to the storage unit 30 and stored in the storage unit 30.

Figure 6:
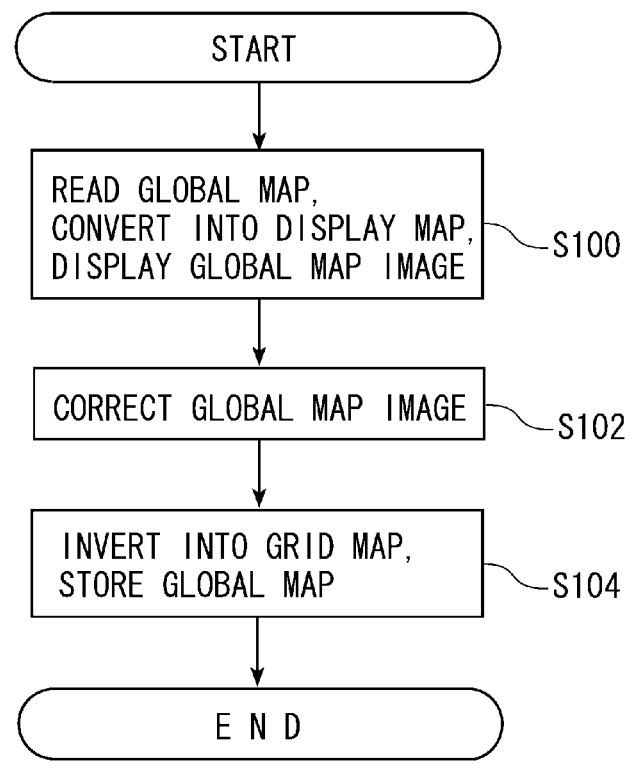
FIG. 6 is a flowchart showing the processing routine of the global map correction processing performed by the global map correction device according to a preferred embodiment of the present invention.

The operation of the global map correction device 3 is now explained with reference to FIG. 6. FIG. 6 is a flowchart showing the processing routine of the global map correction processing performed by the global map correction device 3. The global map correction processing shown in FIG. 6 is executed upon receiving the operation from the user.

In step S100, the designated global map to be corrected is read upon receiving the map reading operation from the user, and displayed on the display unit 35. More specifically, when the operation input unit 36 configuring the touch screen 34 acceptably receives the map reading operation from the user, the global map (grid map) stored in the storage unit 30 is converted by the conversion unit 31, the global map image (display map) is thereby generated (refer to FIG. 2, FIG. 3), and displayed on the display unit 35 of the touch screen 34.

Next, in step S102, the global map image displayed on the display unit 35 is corrected upon receiving the correcting operation from the user. More specifically, the color to be used for overwriting is set upon receiving the color designation operation from the user, and the designated area is overwritten or filled with the set color and shading upon receiving the correction area designation operation from the user (refer to FIG. 4). Note that the method of designating the color to be used for overwriting and method of designating the area to be corrected by the user are as described above, and the detailed explanation thereof is omitted. This correction processing is repeatedly performed until the correction of all correction points is completed according to the correcting operation from the user.

When all corrections are complete and the map storage operation is received from the user, the corrected global map is stored in subsequent step S104. More specifically, when the operation input unit 36 acceptably receives the map storage operation from the user, the corrected global map image (display map) stored in the temporary storage unit 33 is inverted by the inversion unit 32, a corrected global map (grid map) is thereby generated (refer to FIG. 3, FIG. 2), and stored in the storage unit 30.

Figure 5:
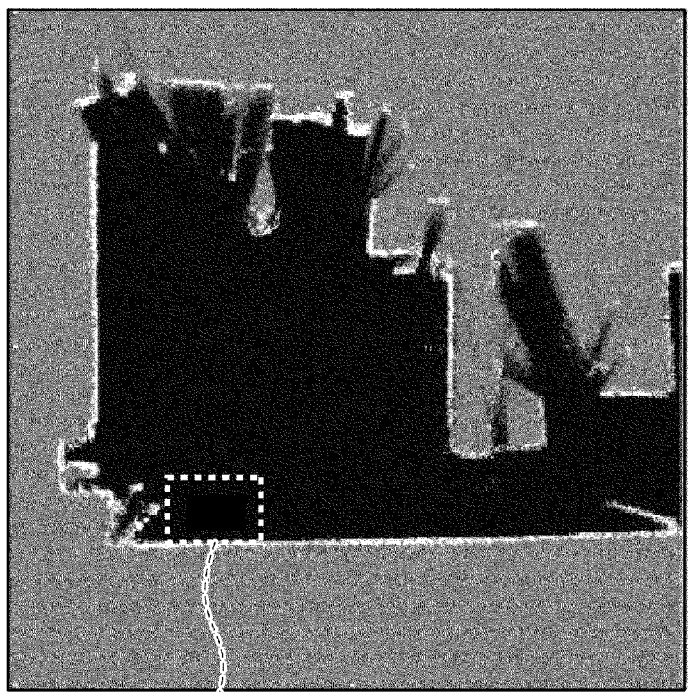
FIG. 5 is a diagram showing an example of the global map before correction and after correction.
Figure 5:
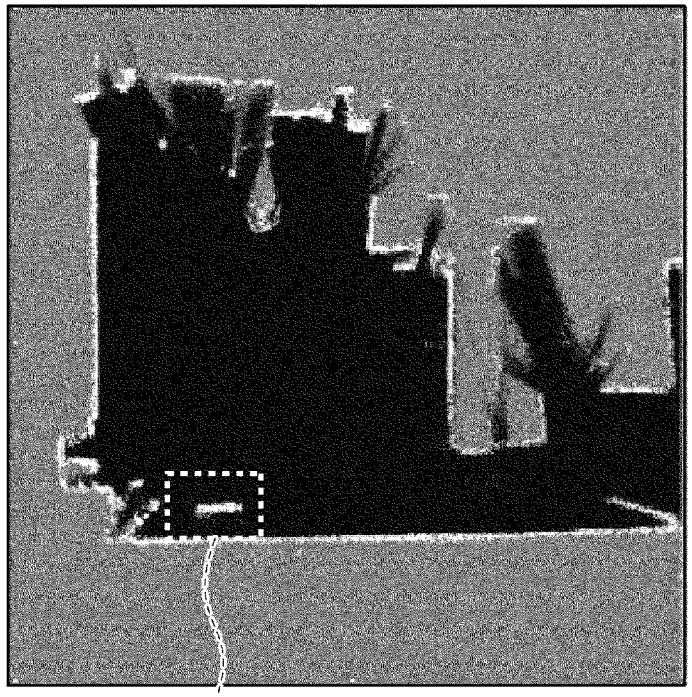

Here, an example of the global map before correction and the global map after correction is shown in FIG. 5. With the example shown in FIG. 5, the object (obstacle) that existed within the frame 500 surrounded by the dotted line before correction has been erased. The global map is corrected to match the actual ambient environment accordingly.

According to this preferred embodiment, the user can correct the global map on the display unit 35 by performing correcting operations via the operation input unit 36 of the touch screen 34. Thus, the difference between the environmental map and the actual ambient environment can be corrected based on the manual operation of the user. Consequently, it is possible to acquire an environmental map which matches the actual ambient environment.

Moreover, according to this preferred embodiment, the conversion/inversion is performed mutually between the object existence probability information and the image information (shading information of a black and white image). Thus, it is possible to acquire a global map (object existence probability information) that was corrected as a result of converting the global map into a global map image and displaying such global map image, and correcting the global map image displayed on the display unit 35. Accordingly, the global map can be corrected more easily.

According to this preferred embodiment, since the shading information of a black and white image was used as the image information corresponding to the object existence probability information, a global map configured from a plurality of grids with object existence probability information can be visually confirmed as a black and white image (global map image) in which the object existence probability information is represented as the shading of a black and white image. Moreover, since the object existence probability information and the shading information of the black and white image are both one-dimensional data, the conversion/inversion between the object existence probability information and the shading information (image information) can be performed easily.

Figure 7:
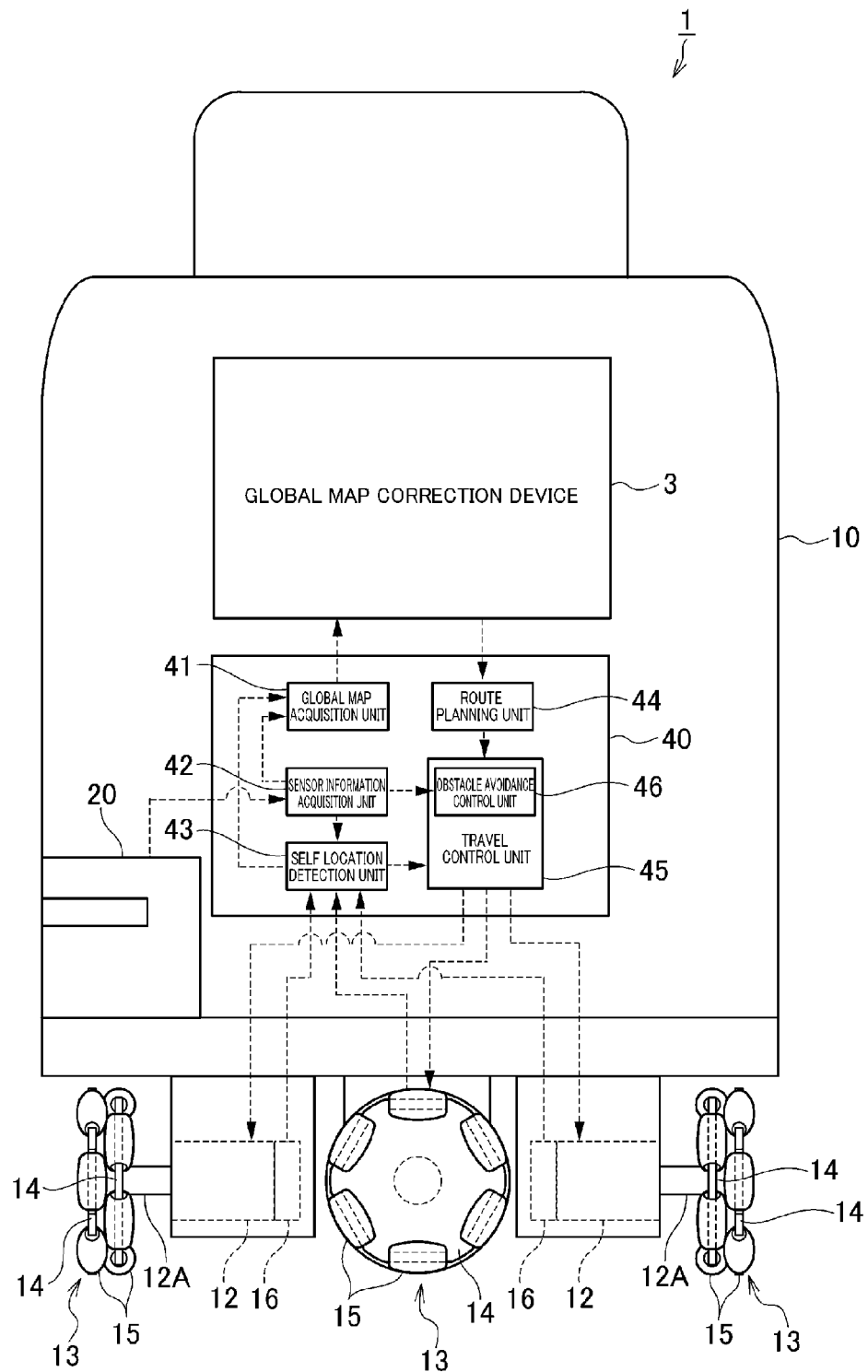
FIG. 7 is a block diagram showing the configuration of the autonomous mobile device mounted with the global map correction device according to a preferred embodiment of the present invention.

The autonomous mobile device 1 mounted with the global map correction device 3 is now explained with reference to FIG. 7. FIG. 7 is a block diagram showing the configuration of the autonomous mobile device 1 mounted with the global map correction device 3.

The autonomous mobile device 1 has a function of acquiring a global map and outputting it to the global map correction device 3, using the corrected global map obtained from the global map correction device 3 and planning a travel route which connects the starting point (starting position) and the destination (goal position) on the global map, and autonomously traveling from the starting position to the goal position along the planned route. Thus, the autonomous mobile device 1 preferably includes the global map correction device 3, as well as a main body 10 provided with an electric motor 12 at the lower portion thereof and an omni wheel 13 that is driven by the electric motor 12, and a laser range finder 20 arranged to measure the distance to the obstacles existing in the periphery. Moreover, the autonomous mobile device 1 preferably includes an electronic controller 40 which plans the travel route using the global map corrected by the global map correction device 3, and which controls the electric motor 12 so that the autonomous mobile device 1 travels along the planned route. Each of the constituent elements is described in detail below.

The main body 10 preferably is a metal frame formed, for example, in an approximate cylindrical bottomed shape, and the main body 10 is mounted with the laser range finder 20, the electronic controller 40 including the global map correction device 3, and so on. Note that the shape of the main body 10 is not limited to an approximate cylindrical bottomed shape. At the lower portion of the main body 10, preferably four electric motors 12 are disposed and mounted in a cross shape, for example. An omni wheel 13 is mounted to a drive shaft 12A of each of the four electric motors 12. Specifically, the four omni wheels 13 are mounted by being spaced at 90° intervals along the circumferential direction in a concyclic manner.

The omni wheel 13 is a wheel including two wheels 14 that rotate around the drive shaft 12A of the electric motor 12, and six free rollers 15 provided rotatably around a shaft that is orthogonal to the drive shaft 12A of the electric motor 12 at the outer circumference of the respective wheels 14, and can move omnidirectionally. Note that the two wheels 14 are mounted by shifting the phase by 30°. Based on this kind of configuration, when the electric motor 12 is driven and the wheel 14 is rotated, the six free rollers 15 rotate integrally with the wheels 14. Meanwhile, as a result of the grounded free rollers 15 rotating, the omni wheel 13 can also move in a direction that is parallel with the rotating shaft of that wheel 14. Thus, by independently controlling the four electric motors 12 and independently adjusting the rotating direction and rotating speed of the respective four omni wheels 13, the autonomous mobile device 1 can be moved in an arbitrary direction (omnidirectionally).

The drive shaft 12A of each of the four electric motors 12 is mounted with an encoder 16 to detect the angle of rotation of the drive shaft 12A. Each encoder 16 is connected to the electronic controller 40, and outputs the detected angle of rotation of the respective electric motors 12 to the electronic controller 40. The electronic controller 40 computes the travel distance of the autonomous mobile device 1 from the angle of rotation of the respective electric motors 12 that was input.

The laser range finder 20 is mounted on the front portion of the autonomous mobile device 1 so as to face the front (forward) direction of the autonomous mobile device 1. The laser range finder 20 scans the circumference of the autonomous mobile device 1 in a fan-like manner in the horizontal direction with a central angle of 240° by emitting a laser and reflecting the emitted laser with a rotating mirror. Subsequently, the laser range finder 20 detects the laser that was returned by reflecting off an object such as a wall or an obstacle, for example, and detects the angle formed by and the distance to the object by measuring the detection angle of the laser (reflected wave) and the time (propagation time) from the emission of the laser to the return thereof upon being reflected off an object. Note that the laser range finder 20 is connected to the electronic controller 40, and outputs, to the electronic controller 40, the detected distance information and angle information relative to the peripheral object.

The electronic controller 40 governs the overall control of the autonomous mobile device 1. The electronic controller 40 preferably includes a microprocessor that performs operations, a ROM that stores programs and the like to cause the microprocessor to execute the respective processes, a RAM that temporarily stores various types of data such as operation results and the like, and a backup RAM that retains stored contents. Moreover, the electronic controller 40 preferably includes an interface circuit arranged to electrically connect the laser range finder 20 and the microprocessor, a motor driver for driving the electric motor 12, and so on.

The electronic controller 40 is configured so that it can mutually exchange data with the global map correction device 3, and generates a global map and outputs it to the global map correction device 3, and additionally acquires the corrected global map from the global map correction device 3. In addition, the electronic controller 40 plans the travel route from the corrected global map and controls the electric motor 12 so that the autonomous mobile device 1 travels along the planned route. Thus, the electronic controller 40 preferably includes a global map acquisition unit 41, a sensor information acquisition unit 42, a self location detection unit 43, a route planning unit 44, a travel control unit 45, an obstacle avoidance control unit 46, and the like. Note that each of the foregoing components is preferably configured by combining the foregoing hardware and software. The electronic controller 40, the electric motor 12, and the omni wheel 13 function as the moving device described in the claims.

The global map acquisition unit 41 preferably uses, for example, SLAM technology or the like to generate a global map showing an object area (obstacles area) containing objects (obstacles) and an area that does not contain obstacles. Specifically, the global map acquisition unit 41 functions as the environmental map acquisition device described in the claims. For example, when generating a global map using the SLAM technology, foremost, the global map acquisition unit 41 generates a local map based on the distance information and angle information relative to the peripheral object that are read from the laser range finder 20 via the sensor information acquisition unit 42. Moreover, the global map acquisition unit 41 acquires the self location from the self location detection unit 43. Note that the self location detection unit 43 verifies the local map and global map in consideration of the calculated travel distance of the autonomous mobile device 1 according to the angle of rotation of the respective electric motors 12 read from the encoder 16, and estimates the self location based on the verification results. Subsequently, the global map acquisition unit 41 projects the local map on the global map by adjusting the self location from the coordinate system with the laser range finder 20 as the original point to the coordinate system of the global map and performing coordinate transformation to the local map with the laser range finder 20 as the original point. The global map acquisition unit 41 repeatedly executes this processing while traveling, and generates a global map of the entire ambient environment by sequentially appending (adding) the local map to the global map. Note that the global map generated by the global map acquisition unit 41 is output to the global map correction device 3.

The route planning unit 44 reads the global map corrected by the global map correction device 3, and plans the travel route of the autonomous mobile device 1 from the corrected global map. Specifically, the route planning unit 44 functions as the travel route planning device described in the claims. The route planning unit 44 foremost generates an extended obstacle area by extending the outline of the obstacle area included in the corrected global map in an amount corresponding to the radius of the autonomous mobile device 1 by using the Minkowski sum, and extracts the area excluding the extended obstacle area as the movable area where the autonomous mobile device 1 can be move without coming in contact with an obstacle. Next, the route planning unit 44 thins the extracted movable area with the Hilditch thinning method. Subsequently, the route planning unit 44 plans the travel route by searching for the shortest route connecting the starting position and the goal position within the thinned movable area by using the A* algorithm (A star algorithm).

The travel control unit 45 controls the electric motor 12 so as to cause the autonomous mobile device 1 to travel along the planned travel route to the goal position while avoiding obstacles. Here, in this preferred embodiment, a virtual potential method was adopted as the control method of moving the autonomous mobile device 1 along the travel route to the goal position while avoiding obstacles. The virtual potential method is a method of generating a virtual gravitation potential field relative to the goal position and a virtual repulsion potential field relative to the obstacle to be avoided, and superposing these to generate a route that heads to the goal position while avoiding contact with the obstacles. More specifically, the travel control unit 45 foremost calculates the virtual gravitation for heading toward the goal position based on the self location. Meanwhile, a virtual repulsion for avoiding obstacles is calculated by the obstacle avoidance control unit 46 based on the self location, travel speed, position and speed of obstacles. Subsequently, the travel control unit 45 calculates the virtual force vector by performing vector synthesis to the obtained virtual gravitation and virtual repulsion. The travel control unit 45 controls the travel of the autonomous mobile device 1 to move to the goal position while avoiding obstacles by driving the electric motor 12 (omni wheel 13) according to the obtained virtual force vector.

According to this preferred embodiment, since the global map correction device 3 is provided, it is possible to acquire a global map which matches the actual ambient environment. Thus, for example, upon planning a travel route from a global map, it is possible to prevent drawbacks such as determining that it is not possible to pass through a passage, which in reality can be passed through, due to the existence of an obstacle. Consequently, it is possible to move along an optimal travel route which matches the actual ambient environment. Moreover, since the autonomous mobile device 1 is mounted with the global map correction device 3, the successive processes of generating a global map, correcting a global map, and route planning based on a global map can be performed efficiently.

A preferred embodiment of the present invention was explained above, but the present invention is not limited to the foregoing preferred embodiment, and can be modified variously. For example, in the foregoing preferred embodiment, although the object existence probability information of the respective grids configuring the global map is preferably converted into the black and white shading information upon displaying an image on the global map, the image information to be converted is not limited to shading information of the black and white image. For example, the image information may be converted into shading information of a color (monochrome) other than black and white, or color information. Moreover, the correspondence of the object existence probability and the shading information is not limited to the foregoing preferred embodiment. For example, the relationship of white and black corresponding to the object existence probability can be reversed.

In the foregoing preferred embodiment, although the global map was corrected preferably by correcting the image, the configuration may also be such that the numerical value of the object existence probability of the respective grids configuring the global map (grid map) is directly corrected.

In the foregoing preferred embodiment, although a touch screen in which the display unit and the operation input unit are preferably integral was used, the configuration may also be such that a standard display is used as the display device, and a keyboard, a mouse and the like are used as the operation input device.

In the foregoing preferred embodiment, although the configuration was such that the global map correction device 3 and the electronic controller 40 were preferably separate from each other, the configuration and allotted functions of the global map correction device 3 and the electronic controller 40 are not limited to the foregoing preferred embodiment. For example, the global map correction device 3 and the electronic controller 40 may be configured using the same hardware.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An environmental map correction device, comprising:
a display device arranged to display an environmental map showing an object area in which an object exists;
an input device arranged to receive a correcting operation from a user to correct the environmental map displayed by the display device;
a correction device arranged to correct the environmental map displayed by the display device based on the correcting operation received by the input device;
a conversion device arranged to convert, into image information, object existence probability information of a plurality of grids configuring the environmental map; and
an inversion device arranged to invert the image information into the object existence probability information; wherein
the display device displays an environmental map image based on image information converted by the conversion device;
the correction device corrects the environmental map image displayed by the display device; and
the inversion device inverts the image information of the environmental map image corrected by the correction device into the object existence probability information.

2. The environmental map correction device according to claim 1, wherein the image information is shading information of a black and white image.

3. The environmental map correction device according to claim 2, wherein the object existence probability information and the shading information of the black and white image are both one-dimensional data.

4. An autonomous mobile device, comprising:
an environmental map acquisition device arranged to acquire an environmental map showing an object area in which an object exists;
the environmental map correction device according to claim 3 arranged to correct the environmental map acquired by the environmental map acquisition device;
a travel route planning device arranged to plan a travel route from the environmental map corrected by the environmental map correction device; and
a moving device arranged to drive the autonomous mobile device to travel along the travel route planned by the travel route planning device.

5. An autonomous mobile device, comprising:
an environmental map acquisition device arranged to acquire an environmental map showing an object area in which an object exists;
the environmental map correction device according to claim 1 arranged to correct the environmental map acquired by the environmental map acquisition device;
a travel route planning device arranged to plan a travel route from the environmental map corrected by the environmental map correction device; and
a moving device arranged to drive the autonomous mobile device to travel along the travel route planned by the travel route planning device.

* * * * *